Oct. 26, 1943.   H. T. COHEN   2,332,781
MANUFACTURE OF WATER GAS
Filed May 7, 1940
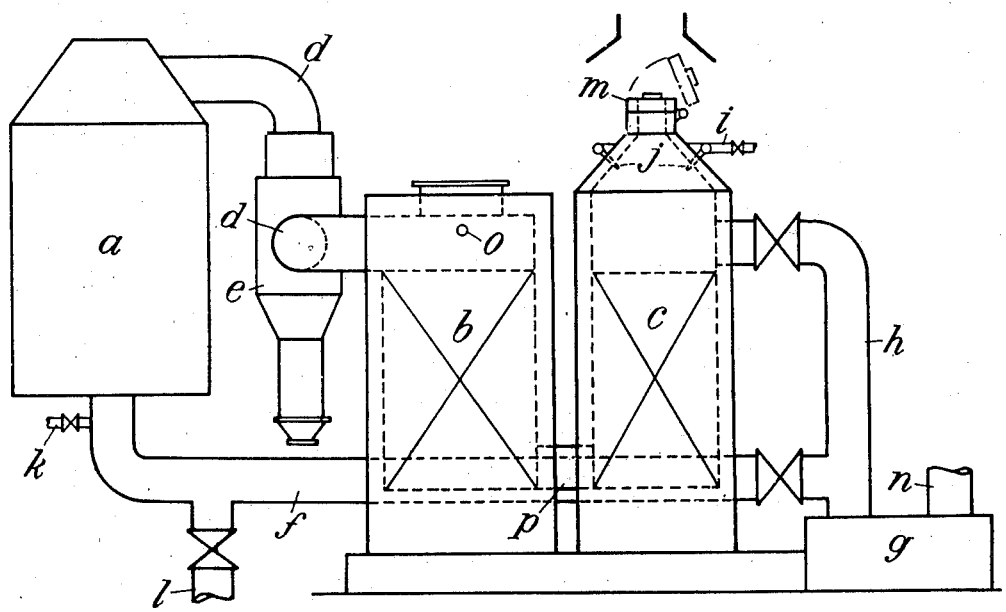
Inventor
Hugh Thurston Cohen
By Dowell & Dowell
Attorneys Patented Oct. 26, 1943

2,332,781

UNITED STATES PATENT OFFICE 2,332,781

MANUFACTURE OF WATER GAS

Hugh Thurston Cohen, Bushey, England, assignor to Humphreys & Glasgow Limited, Westminster, London, England Application May 7, 1940, Serial No. 333,864
In Great Britain June 17, 1939

1 Claim. (Cl. 48—204)

In larger water gas apparatus it is usual for the final blast gases to pass through a waste heat boiler of the tubular type before escaping to the atmosphere; thus any unconsumed products of combustion are cooled sufficiently to prevent noise or flame or sparks when they issue to the atmosphere.

In certain cases, e. g., where water gas plant is provided only for use in emergency or where waste steam or steam from an external source is available, it is desirable to avoid the capital expenditure required for the waste heat boiler, but its omission, besides reducing the steam raising capacity of the plant as a self-contained unit, leads to noise or flame or sparks resulting from the high temperature of the escaping blast products.

Now according to this invention the reduction or prevention of such noise or flame or sparks is accomplished and the generation of all or any desired portion of the steam required during the back-run period of the water gas operating cycle is effected, without the customary waste heat boiler but with the increased thermal efficiency due to its use by passing the blast gases, on leaving the generator, into a heat recuperator containing firebrick checkerwork, where their potential energy is developed by secondary combustion and part of the heat stored, and thence into a separate heat recuperator containing iron or steel or other refractory non-disintegrating material that absorbs residual heat from the blast products and thus renders them non-luminous before they issue to atmosphere, the absorbed residual heat being used, after the cessation of the blow, to generate steam from water sprayed on to the iron or steel or other refractory non-disintegrating material, which steam then passes over the firebrick checkerwork in the other recuperator, thus being superheated, and through the generator to effect a back-run.

The generator is preferably of the type provided with an annular steam boiler constituting part of its wall and the steam generated in this boiler is used for gas making in the generator for instance for the up-run.

The use of such separate heat recuperators in this way enables a heavy refractory material which will not disintegrate under the successive action of heat absorption and water cooling to be used for steam generation and ordinary firebrick checkerwork to be used for superheating the steam without it being subjected to the disintegrating action of water or crushing by superposed weight. The water (which may be polluted water otherwise difficult to dispose of) is introduced into the recuperator containing the iron or steel or other refractory non-disintegrating material through one or more spraying devices, the amount being regulated according to the steam required in the process.

The two heat recuperators may be separate vessels directly connected and arranged vertically side by side or they may be communicating compartments of a single large vessel on opposite sides of a partition wall.

The connection between the vessel or compartment containing firebrick and the top of the generator may be provided with one or more dust catching devices.

In the manufacture of water gas as described, the back-run period may comprise two or more short back-runs separated from each other by an interposed up-run as described in the specification of application for British Letters Patent No. 13,034, dated 2 May, 1938. Moreover the purging of the set may be carried out as described in the specification of application for British Letters Patent No. 13,033, dated 2 May, 1938.

The accompanying drawing illustrates diagrammatically in side elevation one form of water gas apparatus according to the invention.

$a$ is the generator, $b$ the recuperator containing firebrick checkerwork, $c$ the recuperator containing iron or steel or other refractory non-disintegrating material, $d$ a connection between the top of the generator and the recuperator $b$, $e$ a dust catcher on said connection, $f$ a valved connection between the bottom of the generator and a washer $g$, $h$ a valved connection between the top of the recuperator $c$ and the washer $g$, $i$ water supply pipe to spraying jets $j$ in the top of the recuperator $c$, $k$ a supply pipe for up-run steam, $l$ a blast air supply pipe, $m$ the stack valve at the top of the recuperator $c$, $n$ the finished water gas offtake and $o$ the secondary air supply to the recuperator $b$.

The recuperators $b$ and $c$ are shown as separate vessels arranged vertically side by side and are directly connected at the bottom through a pipe $p$, blast gas and up-run gas flowing from the top of the generator down through the recuperator $b$ and up through the recuperator $c$ to the stack valve and washer respectively.

Instead of separate vessels the recuperators may be compartments of a single large vessel separated by a vertical partition and directly connected by a passage through the lower part thereof or they may be upper and lower compartments of a single vessel separated by a transverse partition which serves to support, independently of the firebrick checkerwork, the weight of the iron or steel or other refractory non-disintegrating heat absorbing material; the compartments are directly connected by a passage of any required size through the partition and the blast gas and up-run water gas are led from the top of the generator to the bottom of the lower compartment and flow up through both compartments.

What I claim is:

In a process for the manufacture of water gas by a cyclic process in which an ignited fuel bed in a generator is alternately blasted with air to raise its temperature and then steamed to produce water gas, the steps of passing the blast gases from the generator into a heat recuperating zone containing firebrick checkerwork, introducing secondary air and burning the hot blast gases in the said recuperating zone and storing a part of the heat therein, passing the gases from said recuperating zone into a second heat recuperating zone containing metallic heat absorbing material to absorb residual heat from the blast products whereby the hot blast gases are cooled by the heat absorbing material, discharging to atmosphere the blast gases cooled and rendered non-luminous, terminating the blow or air blasting period, spraying water on the metallic material after cessation of the blow or air blasting period to generate steam from the sensible heat of the heat absorbing metallic material, passing said steam over the firebrick checkerwork in the first mentioned recuperating zone to superheat the steam, and then passing the superheated steam through the generator to effect a back-run.

HUGH THURSTON COHEN.